US 9,262,174 B2

(12) United States Patent  
Fetterman et al.

(10) Patent No.: US 9,262,174 B2  
(45) Date of Patent: Feb. 16, 2016

(54) DYNAMIC BANK MODE ADDRESSING FOR MEMORY ACCESS

(75) Inventors: Michael Fetterman, Boxborough, MA (US); Stewart Glenn Carlton, Madison, AL (US); Douglas J. Hahn, Los Altos, CA (US); Rajeshwaran Selvanesan, Milpitas, CA (US); Shirish Gadre, Fremont, CA (US); Steven James Heinrich, Madison, AL (US)

(73) Assignee: NVIDIA Corporation, Santa Clara, CA (US)

( * ) Notice: Subject to any disclaimer, the term of this patent is extended or adjusted under 35 U.S.C. 154(b) by 754 days.

(21) Appl. No.: 13/440,945

(22) Filed: Apr. 5, 2012

(65) Prior Publication Data

US 2013/0268715 A1 Oct. 10, 2013

(51) Int. Cl.
  *G06F 13/00* (2006.01)
  *G06F 13/28* (2006.01)
  *G06F 9/38* (2006.01)

(52) U.S. Cl.
  CPC .......... *G06F 9/3887* (2013.01); *G06F 9/3851* (2013.01)

(58) Field of Classification Search
  None
  See application file for complete search history.

(56) References Cited

U.S. PATENT DOCUMENTS

| 6,889,304 | B2 * | 5/2005 | Perego et al. ................. 711/170 |
| 7,805,587 | B1 | 9/2010 | Van Dyke et al. |
| 2005/0071582 | A1 * | 3/2005 | Sohn et al. ..................... 711/154 |
| 2010/0076941 | A1 * | 3/2010 | Dotsenko et al. ............. 707/705 |
| 2010/0235590 | A1 | 9/2010 | Tam |

FOREIGN PATENT DOCUMENTS

| DE | 102009012409 A1 | 11/2009 |
| TW |    201116065 A  |  5/2011 |
| TW |    201214280 A  |  4/2012 |

* cited by examiner

*Primary Examiner* — Eric S Cardwell  
(74) *Attorney, Agent, or Firm* — Artegis Law Group, LLP

(57) ABSTRACT

One embodiment sets forth a technique for dynamically mapping addresses to banks of a multi-bank memory based on a bank mode. Application programs may be configured to perform read and write a memory accessing different numbers of bits per bank, e.g., 32-bits per bank, 64-bits per bank, or 128-bits per bank. On each clock cycle an access request may be received from one of the application programs and per processing thread addresses of the access request are dynamically mapped based on the bank mode to produce a set of bank addresses. The bank addresses are then used to access the multi-bank memory. Allowing different bank mappings enables each application program to avoid bank conflicts when the memory is accesses compared with using a single bank mapping for all accesses.

24 Claims, 9 Drawing Sheets

32-bit data mapped to 8 32-bit banks
460

|  | Banks | | | | | | | |
|---|---|---|---|---|---|---|---|---|
|  | 0 | 1 | 2 | 3 | 4 | 5 | 6 | 7 |
| Rows | 0:0 | 0:1 | 0:2 | 0:3 | 0:4 | 0:5 | 0:6 | 0:7 |
|  | Fill | 1:0 | 1:1 | 1:2 | 1:3 | 1:4 | 1:5 | 1:6 |
|  | 1:7 | Fill | 2:0 | 2:1 | 2:2 | 2:3 | 2:4 | 2:5 |
|  | 2:6 | 2:7 | Fill | 3:0 | 3:1 | 3:2 | 3:3 | 3:4 |
|  | 3:5 | 3:6 | 3:7 | Fill | 4:0 | 4:1 | 4:2 | 4:3 |
|  | 4:4 | 4:5 | 4:6 | 4:7 | Fill | 5:0 | 5:1 | 5:2 |
|  | 5:3 | 5:4 | 5:5 | 5:6 | 5:7 | Fill | 6:0 | 6:1 |
|  | 6:2 | 6:3 | 6:4 | 6:5 | 6:6 | 6:7 | Fill | 7:0 |
|  | 7:1 | 7:2 | 7:3 | 7:4 | 7:5 | 7:6 | 7:7 | Fill |

Figure 4B

Figure 4C 32-bit data mapped to 8 64-bit banks
462

| Rows | Banks |  |  |  |  |  |  |  |
|---|---|---|---|---|---|---|---|---|
|  | 0 | 1 | 2 | 3 | 4 | 5 | 6 | 7 |
|  | 0:0 | 0:2 | 0:4 | 0:6 | Fill | 1:1 | 1:3 | 1:5 |
|  | Fill | 0:3 | 0:5 | 0:7 | 1:0 | 1:2 | 1:4 | 1:6 |
|  | 1:7 | 2:0 | 2:2 | 2:4 | 2:6 | 3:0 | 3:1 | 3:3 |
|  | 3:5 | 3:7 | 4:0 | 4:2 | 4:4 | 4:6 | Fill | 5:0 |
|  | 5:3 | 5:5 | 5:7 | 6:0 | 6:2 | 6:4 | 6:6 | 6:7 |
|  | Fill | 5:6 | Fill | 6:1 | 4:5 | 4:7 | 5:1 | Fill |
|  | 7:1 | 7:3 | 7:5 | 7:7 | 6:3 | 6:5 | 4:3 | 5:2 |
|  | 7:2 | 7:4 | 7:6 |  |  |  |  | 7:0 |

Figure 4D 32-bit data mapped to 8 64-bit banks
464

| Rows | Banks |  |  |  |  |  |  |  |
|---|---|---|---|---|---|---|---|---|
|  | 0 | 1 | 2 | 3 | 4 | 5 | 6 | 7 |
|  | 0:0 | 0:1 | 0:2 | 0:3 | 0:4 | 0:5 | 0:6 | 0:7 |
|  | Fill | 1:0 | 2:0 | 1:2 | 2:2 | 2:3 | 2:4 | 2:5 |
|  | 1:7 | 2:6 | Fill | 2:1 | 3:1 | 3:2 | 3:3 | 3:4 |
|  | 3:5 | 3:6 | 3:7 | 3:0 | 4:0 | 4:1 | 4:2 | 4:3 |
|  | 5:3 | 6:2 | 5:5 | 4:6 | Fill | 5:0 | 5:1 | 6:1 |
|  | Fill | 5:4 | 6:3 | 5:6 | 5:7 | 6:5 | Fill | Fill |
|  | 7:1 | Fill | 6:4 | 6:6 | Fill | 7:6 | Fill | 7:0 |
|  |  | 7:2 | 7:3 | 7:4 | 7:5 |  | 7:7 | Fill |

DYNAMIC BANK MODE ADDRESSING FOR MEMORY ACCESS

BACKGROUND OF THE INVENTION

1. Field of the Invention

The present invention generally relates to parallel processing and, more specifically, to a parallel architecture that supports dynamic bank address mapping for multi-bank memory accesses.

2. Description of the Related Art

In a single-instruction multiple-thread (SIMT) processing environment, threads are organized in groups of P parallel threads called warps that execute the same program. Although the P threads of a thread group execute each instruction of the program in parallel, each thread of a thread group independently executes the instruction using its own data and registers. Each thread in the thread group is configured to access a multi-bank memory using a fixed mapping of per-thread addresses to the banks of the multi-bank memory. If multiple threads need to access two or more locations in the same bank of memory than can be accessed in a single clock cycle, a bank conflict exists.

Application programs are typically authored to reduce bank conflicts when the parallel threads of a thread group read and write the multi-bank memory so that data for all of the parallel threads in the thread group may be read or written in a single clock cycle. For example, a program may be authored so that either a row or a column of an array of data may be accessed by a thread group without any bank conflicts. When bank conflicts do occur, the accesses for addresses mapped to the same bank must be completed in separate clock cycles, thereby reducing performance.

Accordingly, what is needed in the art is method for avoiding bank conflicts when parallel threads of a thread group access a multi-bank memory.

SUMMARY OF THE INVENTION

A system and method for processing a memory access request for parallel threads of a thread group that access a multi-bank memory supports different bank bit-widths. Per-thread addresses are mapped to banks of a memory based on a bank mode that defines a per-bank bit-width. Application programs may be configured to read and write a memory accessing different numbers of bits per bank, e.g., 32-bits per bank, 64-bits per bank, or 128-bits per bank. On each clock cycle an access request and bank mode may be received for one of the application programs and per processing thread addresses of the access request are dynamically mapped based on the bank mode to produce a set of bank addresses. The bank addresses are then used to access the memory. Allowing different bank mappings based on a bank mode that is specific to each access request enables each application program to avoid bank conflicts compared with using a single bank mapping for all accesses.

Various embodiments of a method of the invention for accessing a multi-bank memory include receiving a memory access instruction that specifies an individual memory address. A bank mode that defines a per-bank bit-width is received and the individual memory address is dynamically mapped, based on the bank mode, to produce a mapped individual memory address. A read request or a write request is then transmitted to the multi-bank memory to execute the memory access instruction for the mapped individual memory address.

Various embodiments of the invention include a processing subsystem for accessing a multi-bank memory. The processing subsystem includes an address generation unit and a load/store unit that is coupled between the address generation unit and a multi-bank memory. The address generation unit is configured to receive a memory access instruction that specifies an individual memory address. The address generation unit is also configured to receive a bank mode that defines a per-bank bit-width and dynamically maps the individual memory address based on the bank mode to produce a mapped individual memory address. The load/store unit is configured to transmit a read request or a write request to the multi-bank memory to execute the memory access instruction for the mapped individual memory address.

One advantage of the disclosed method is that the address to bank mapping used to access a multi-bank memory may change each clock cycle. Each memory address specified for parallel thread in a thread group is dynamically mapped to a bank address based on the bank mode specified for the access request. Thus, a first application program that is authored to avoid bank conflicts when each bank stores 32 bits of data may use a different memory address to bank address mapping compared with a second application program that is authored to avoid bank conflicts when each bank stores 64 bits of data. In sum, an older (legacy) application program authored for execution by a processor having a first bank size may run without incurring a performance degradation when executed on a contemporary processor capable of dynamically mapping addresses to support the first bank size as well as larger bank sizes needed for higher-bit width operations that are performed by the contemporary processor.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4B is a conceptual diagram illustrating a mapping of an 8×8 array of 32 bit data to 8 32 bit banks;

FIG. 4C is a conceptual diagram illustrating a mapping of an 8×8 array of 32 bit data to 8 64-bit banks, according to one embodiment of the present invention;

FIG. 4D is a conceptual diagram illustrating another mapping of an 8×8 array of 32 bit data to 8 64-bit banks, according to one embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
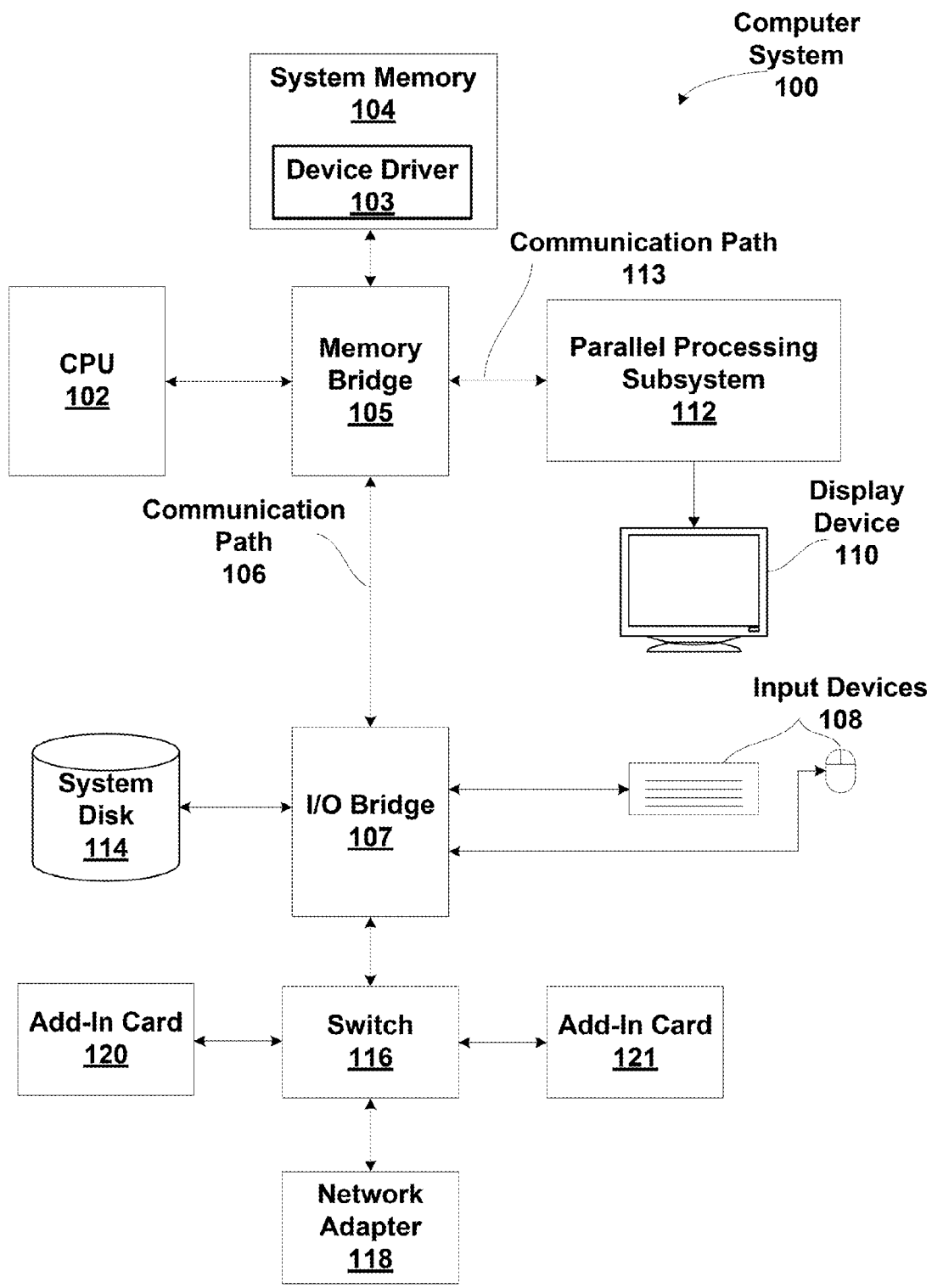
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
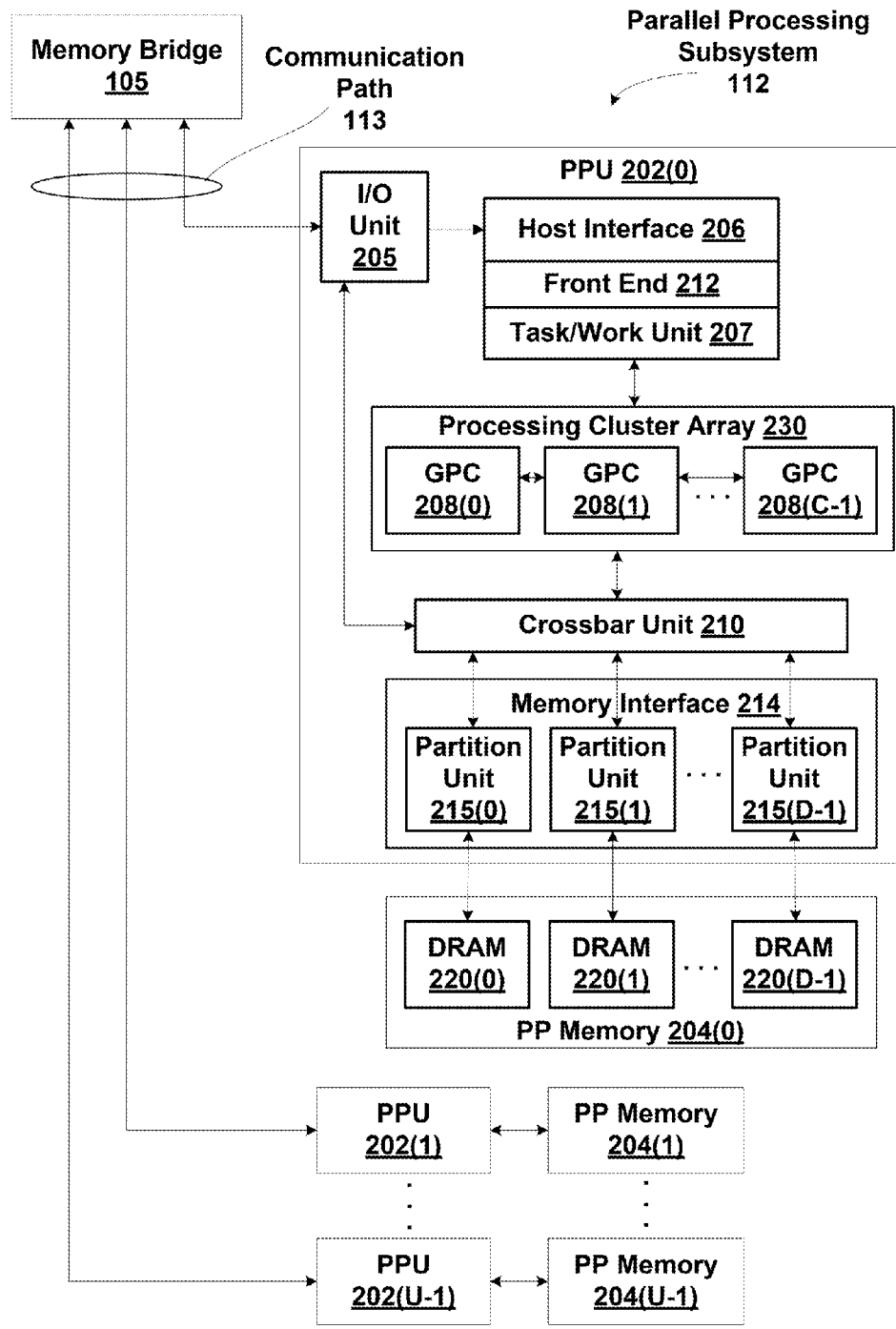
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
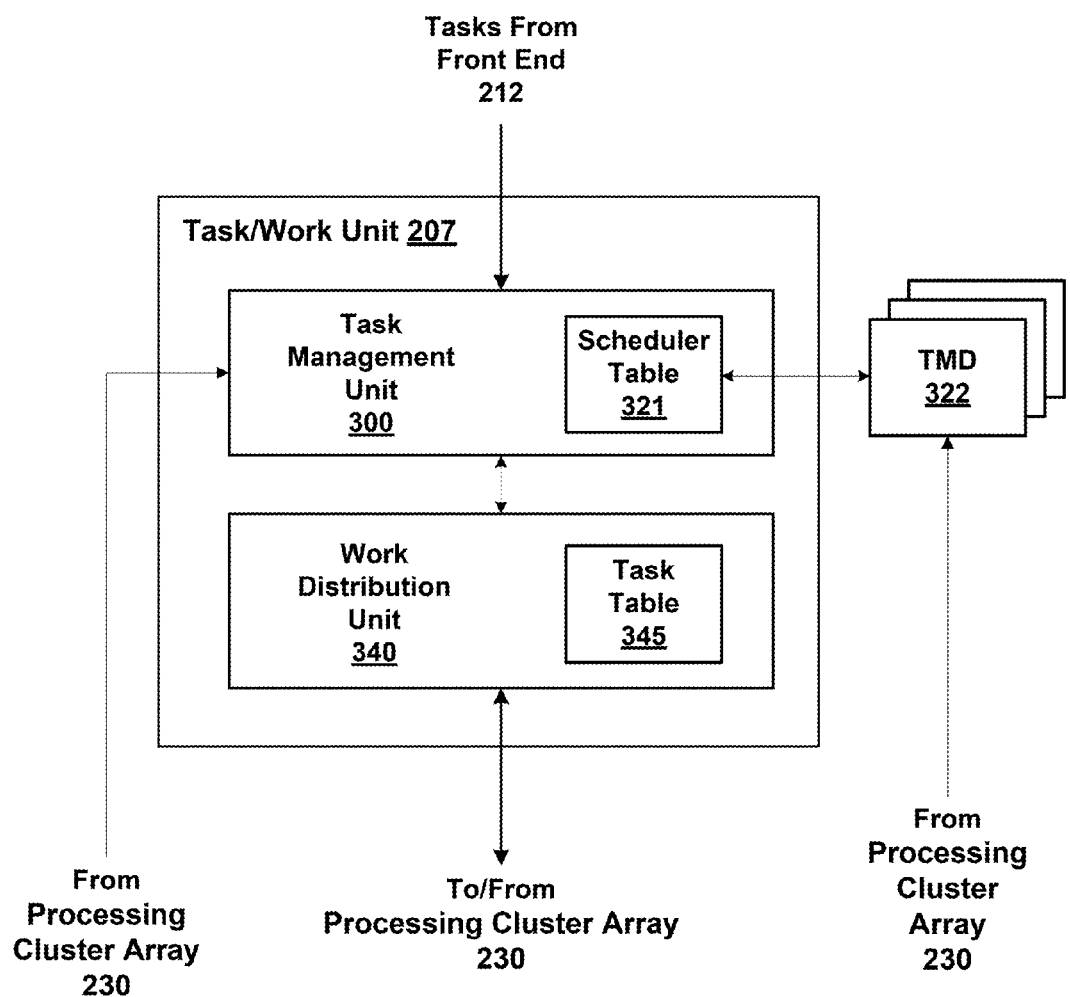
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled, based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
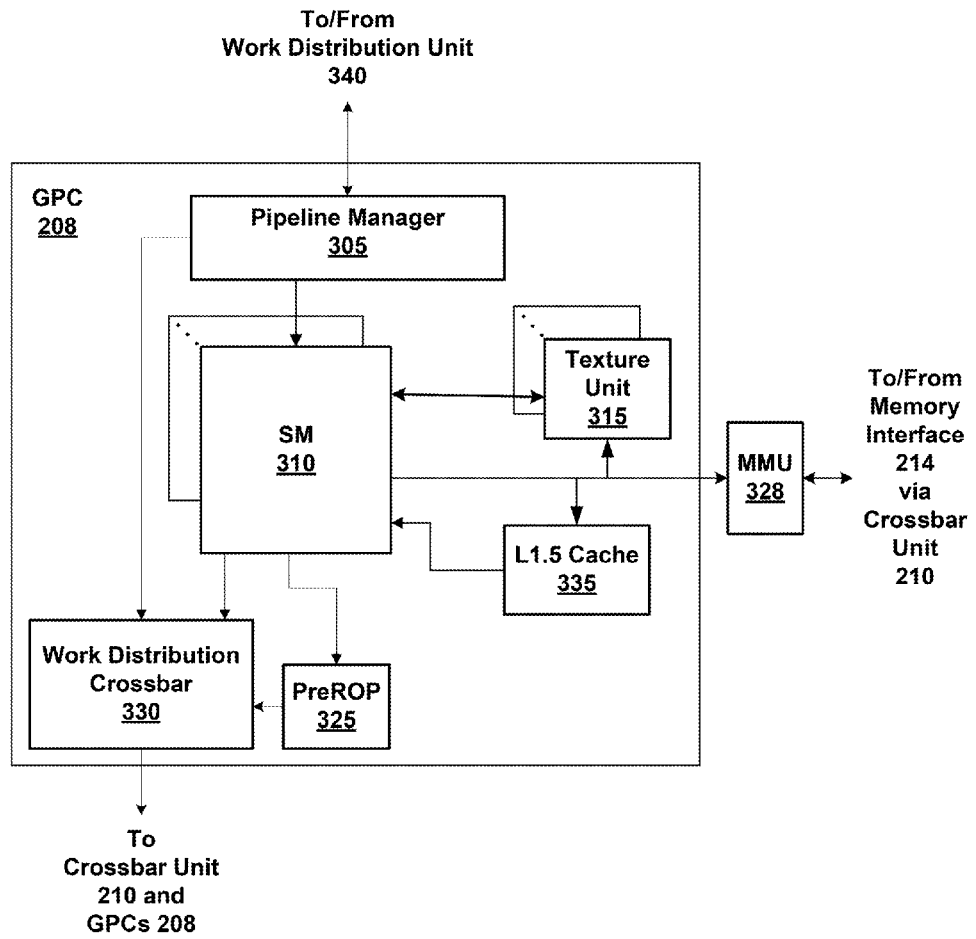
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
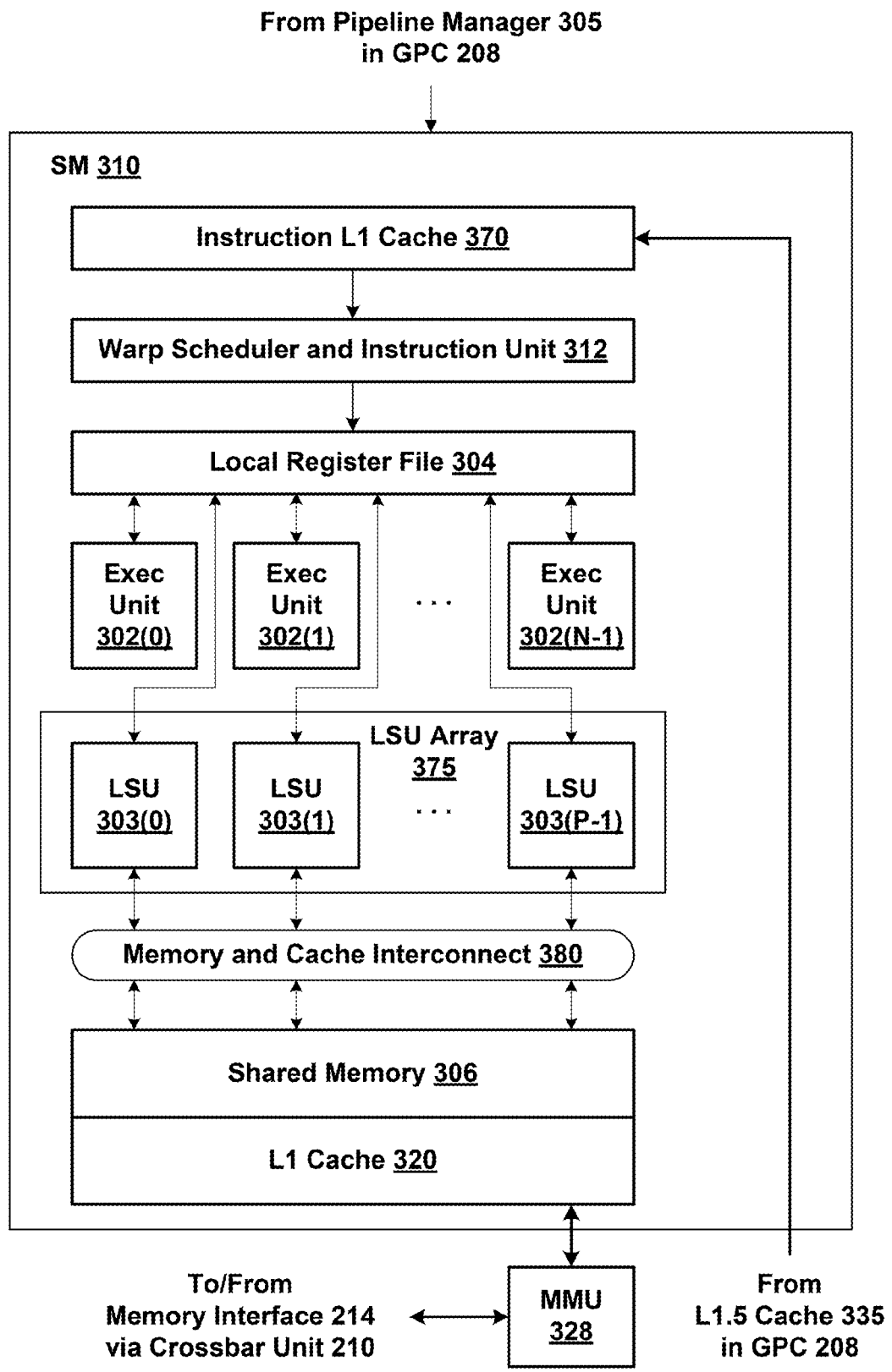
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303 within an LSU array 375.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs and a bank mode that defines a per-bank bit-width of a multi-bank shared memory 306. The bank mode controls how per-thread addresses are mapped to the different banks of the multi-bank shared memory 306.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to threads within a single CTA; in other words, any location in shared memory 306 is accessible to any thread within the same CTA (or to any processing engine within SM 310). Shared memory 306 can be implemented as a multi-banked shared register file or shared on-chip cache memory with an interconnect that allows any processing engine to read from or write to any location in the shared memory 306. The number of banks used to construct the shared memory 306 may equal the number of threads in a thread group so that each thread may access the shared memory 306 in parallel.

In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in the LSU array 375 includes an address generation unit (shown in FIG. 4A) that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

At the application and compiler level, the distinct memory spaces appear within a single unified address space. Therefore, unified memory access instructions are used, instead of separate load and store instructions for each distinct memory space. A C/C++ program may use one unified pointer and one unified access instruction to efficiently access any of the three distinct address spaces. An example load instruction format is: LD.32 Rd, [Ra+offset]; which executes on a group of P parallel threads, and loads each thread's register Rd with 32 bits of data from memory at each unified byte address specified by the sum of each thread's register Ra plus offset. An example store instruction format is: ST.32 [Ra+offset], Rb; which executes on a group of P parallel threads, and stores 32 bits of data from each thread's register Rb to memory at each unified byte address specified by the sum of each thread's register Ra plus offset.

The exec units 302 are configured to process 32, 64, and 128 bit data, so the load and store instructions access read and write, respectively, 64 and 128 bit data. While some embodiments of the shared memory 306 are constructed using 32 bit wide banks, more recently, the shared memory 306 is constructed using 64 or 128 bit wide banks. A "legacy" application program authored to avoid bank conflicts assuming that the shared memory 306 is constructed using 32 bit wide banks may incur bank conflicts when executed on a non-legacy PPU 202 that includes a shared memory 306 that is constructed using 64 or 128 bit wide banks. Rather than requiring that the legacy application program be modified to avoid bank conflicts, a bank mode may be specified that dynamically controls the mapping of per-thread addresses to the banks of the shared memory 306. Thus, the bank mode may be used to allow legacy application programs to execute on newer hardware without incurring bank conflicts that would not have occurred when the legacy application programs are executed by legacy hardware, e.g., a legacy PPU 202 using 32-bit wide banks.

Dynamic Memory Bank Addressing

Each bank of the shared memory 306 is an independently addressable memory, commonly implemented by a static random access memory (SRAM) although other implementations are possible. In a legacy embodiment of the shared memory 306, each successive 32-bit word is stored in a successive bank, and each bank has an independently controlled address. Each 32-bit word is associated with a different thread of a thread group. A non-legacy embodiment of the shared memory 306 is constructed with 64-bit wide banks, so that each thread may read or write a 64-bit value. When a legacy application program is executed and two adjacent 32-bit values for two threads are stored in the same 64-bit wide bank, the two threads have to specify the same address to access the 32-bit values on the same clock cycle. A bank conflict occurs when the two threads have different addresses that both map to the same bank. In contrast, when the legacy application program is executed on legacy hardware and 32-bit values are stored in adjacent banks, each address associated with a thread maps to a different bank and no bank conflicts occur. In sum, an instruction accessing the shared memory 306 which needed only a single clock cycle to execute on legacy hardware may need two clock cycles to execute on newer hardware without the bank mode feature. Although the memory accesses and bank mode are described referencing the shared memory 306, the bank mode may also be used for memory accesses of a multi-bank memory that is not shared between different CTAs.

A first bank mode maps addresses to banks in such a way as to preserve bank conflict characteristics assuming 32 bits per bank. When the first bank mode is used the shared memory 306 or another multi-bank memory operates as if there are 4 bytes per logical bank (4BB mode). A second bank mode maps addresses to preserve bank conflict characteristics assuming 64 bits per bank. When the second bank mode is used the multi-bank memory operates as if there are 8 bytes per logical bank (8BB mode). Other modes are also possible for supporting different numbers of bits per bank.

As an illustration of the first and second bank modes, consider an embodiment of the multi-bank memory with only 8 logical banks of 64 bits each. TABLE 1 shows how consecutive 32 bit words 0 through 15 are stored across the 8 logical banks in a row of the multi-bank memory.

TABLE 1

32-bit words stored in 8 banks
Relative word indices per memory "row" given 8 logical banks of width 2 words each

| | bank: | | | | | | | | | | | | | | | |
|---|---|---|---|---|---|---|---|---|---|---|---|---|---|---|---|---|
| | 0 | | 1 | | 2 | | 3 | | 4 | | 5 | | 6 | | 7 | |
| word within bank: | 0 | 1 | 0 | 1 | 0 | 1 | 0 | 1 | 0 | 1 | 0 | 1 | 0 | 1 | 0 | 1 |
| Bytes/Bank | 4 | 0 | 8 | 1 | 9 | 2 | 10 | 3 | 11 | 4 | 12 | 5 | 13 | 6 | 14 | 7 | 15 |
| | 8 | 0 | 1 | 2 | 3 | 4 | 5 | 6 | 7 | 8 | 9 | 10 | 11 | 12 | 13 | 14 | 15 |

The mapping from per-thread memory address to storage location, e.g., per-thread mappedmemory address, is described by the general equations below. For this example, the following constant parameters and functions apply to the first and the second bank modes:

kBytesPerWord=4 kWordsPerLogicalBank=2 kNumLogicalBanks=8 where the / operator indicates integer division function, the % operator indicates integer modulo function, and addresses are specified in terms of bytes. While 4BB and 8BB bank modes are supported, the following equations are not restricted to those two bank modes. For example, using kWordsPerLogicalBank=4 and kNumLogicalBanks=4 results in a valid and self-consistent mapping across the same logical banks. Note that the physical bank width only has to be less that or equal to the logical bank width.

The following equations describe the mapping of a byte address (byteAddr) to storage within a logical memory bank and a word within that bank for 4BB mode.

bank=(byteAddr/kBytesPerWord)%kNumLogicalBanks;

word=(byteAddr/(kNumLogicalBanks*kBytesPerWord))%kWordsPerLogicalBank;

TABLE 2 shows how byte addresses aligned to word boundaries map to logical banks and the halves within each bank for the 4BB bank mode.

TABLE 2 mapping of byte addresses to banks in 4BB bank mode
4BB mapping of byte addresses to logical banks

| | | bank: 0 | | 1 | | 2 | | 3 | | 4 | | 5 | | 6 | | 7 | |
|---|---|---|---|---|---|---|---|---|---|---|---|---|---|---|---|---|---|
| bank word: | | 0 | 1 | 0 | 1 | 0 | 1 | 0 | 1 | 0 | 1 | 0 | 1 | 0 | 1 | 0 | 1 |
| row | 0 | 0 | 32 | 4 | 36 | 8 | 40 | 12 | 44 | 16 | 48 | 20 | 52 | 24 | 56 | 28 | 60 |
| | 1 | 64 | 96 | 68 | 100 | 72 | 104 | 76 | 108 | 80 | 112 | 84 | 116 | 88 | 120 | 92 | 124 |
| | 2 | 128 | 160 | 132 | 164 | 136 | 168 | 140 | 172 | 144 | 176 | 148 | 180 | 152 | 184 | 156 | 188 |
| | 3 | 192 | 224 | 196 | 228 | 200 | 232 | 204 | 236 | 208 | 240 | 212 | 244 | 216 | 248 | 220 | 252 |
| | 4 | 256 | 288 | 260 | 292 | 264 | 296 | 268 | 300 | 272 | 304 | 276 | 308 | 280 | 312 | 284 | 316 |
| | 5 | 320 | 352 | 324 | 356 | 328 | 360 | 332 | 364 | 336 | 368 | 340 | 372 | 344 | 376 | 348 | 380 |
| | 6 | 384 | 416 | 388 | 420 | 392 | 424 | 396 | 428 | 400 | 432 | 404 | 436 | 408 | 440 | 412 | 444 |
| | 7 | 448 | 480 | 452 | 484 | 456 | 488 | 460 | 492 | 464 | 496 | 468 | 500 | 472 | 504 | 476 | 508 |

The following equations describe the mapping of a byte address (byteAddr) to storage within a logical memory bank and a word within that bank for the 8BB bank mode.

bank=(byteAddr/
(kBytesPerWord*kWordsPerLogicalBank)
%kNumLogicalBanks;

word=(byteAddr/kBytesPerWord)%kWordsPerLogicalBank;

TABLE 3 shows how byte addresses aligned to word boundaries map to logical banks and the halves within each bank for the 8BB bank mode.

TABLE 3 mapping of byte addresses to banks in 8BB bank mode
8BB mapping of byte addresses to logical banks

| | | bank: 0 | | 1 | | 2 | | 3 | | 4 | | 5 | | 6 | | 7 | |
|---|---|---|---|---|---|---|---|---|---|---|---|---|---|---|---|---|---|
| bank word: | | 0 | 1 | 0 | 1 | 0 | 1 | 0 | 1 | 0 | 1 | 0 | 1 | 0 | 1 | 0 | 1 |
| row | 0 | 0 | 4 | 8 | 12 | 16 | 20 | 24 | 28 | 32 | 36 | 40 | 44 | 48 | 52 | 56 | 60 |
| | 1 | 64 | 68 | 72 | 76 | 80 | 84 | 88 | 92 | 96 | 100 | 104 | 108 | 112 | 116 | 120 | 124 |
| | 2 | 128 | 132 | 136 | 140 | 144 | 148 | 152 | 156 | 160 | 164 | 168 | 172 | 176 | 180 | 184 | 188 |
| | 3 | 192 | 196 | 200 | 204 | 208 | 212 | 216 | 220 | 224 | 228 | 232 | 236 | 240 | 244 | 248 | 252 |
| | 4 | 256 | 260 | 264 | 268 | 272 | 276 | 280 | 284 | 288 | 292 | 296 | 300 | 304 | 308 | 312 | 316 |
| | 5 | 320 | 324 | 328 | 332 | 336 | 340 | 344 | 348 | 352 | 356 | 360 | 364 | 368 | 372 | 376 | 380 |
| | 6 | 384 | 388 | 392 | 396 | 400 | 404 | 408 | 412 | 416 | 420 | 424 | 428 | 432 | 436 | 440 | 444 |
| | 7 | 448 | 452 | 456 | 460 | 464 | 468 | 472 | 476 | 480 | 484 | 488 | 492 | 496 | 500 | 504 | 508 |

As previously explained, the SM 310 supports concurrent execution of multiple warps, where the warps could be closely related to each other (belonging to a CTA), loosely related to each other by belonging to different CTAs, or not related at all be belonging to different grid of CTAs. While a static choice of the bank mode might work reasonably well for the warps generated on the same SM 310 by a single grid of CTAs, performance of warps generated by a different grid may be reduced when all warps use the same bank mode. For example, the warps of a first grid may be performing 32-bit accesses and warps of a second grid may be performing mostly 64-bit or 128-bit accesses. If warps from both grids are run on the same SM 310, one of the warps may suffer unintended bank conflicts. If execution of the second grid is delayed until after execution of the first grid finishes, the warp occupancy in the SM 310 may be reduced, creating idle bubbles, i.e., clock cycles when no instruction is processed.

The bank mode may be specified for each access request, i.e. for each warp, so that the per-thread addresses are mapped according to either the 4BB bank mode, the 8BB bank mode, or a different bank mode. The bank mode is stored in the TMD 322 for each grid, so the same bank mode is used for all warp that execute the TMD 322. In other embodiments, the bank mode may be specified as part of the load or store program instruction or the bank mode may be specific to different portions of the multi-bank memory.

Regardless of how the bank mode is provided for an access request, the physical locations written using one bank mode will not necessarily be the same physical locations read using a different bank mode. The dynamic bank mode feature is intended to allow legacy application program to execute without incurring additional bank conflicts, i.e., to maintain or improve the performance of the legacy application program when executed by newer hardware. Therefore the bank mode may change during execution of a particular application program if care is taken to ensure consistent access within a warp, e.g., by providing boundary points in the application program such as barrier instructions. When all warps launched for one grid use the same bank mode, the warps may still be freely interleaved with warps launched from other grids using a different bank mode during execution by an SM 310.

Finally, the bank mode may be forced to a particular setting that is different than the bank mode specified for the grid or application program. A forced setting may be used for debugging, profiling, and auto-tuning purposes.

Figure 4A:
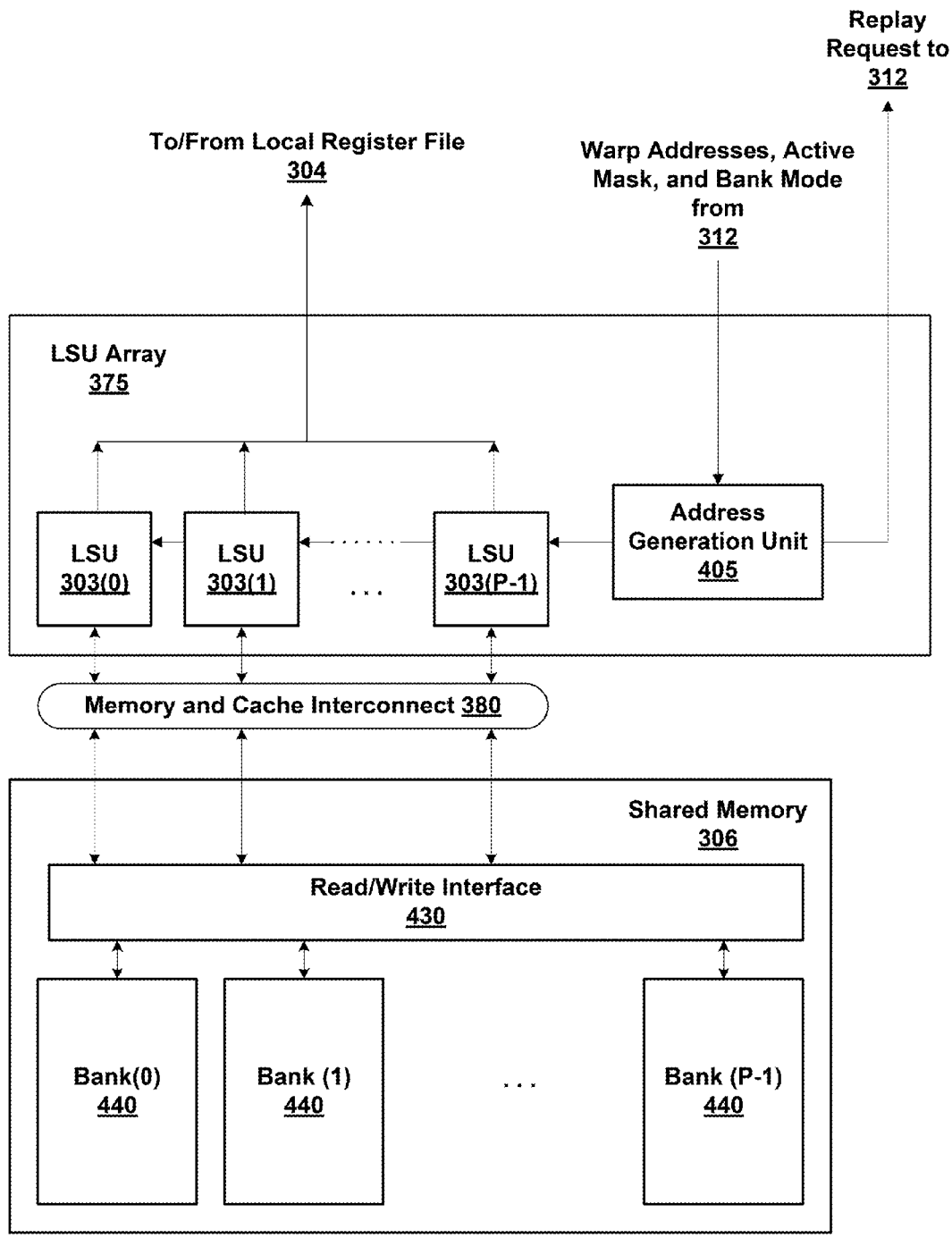
FIG. 4A is a block diagram of the load/store unit (LSU) array and shared memory of FIG. 3C, according to one embodiment of the present invention.

FIG. 4A is a block diagram of the LSU 375 array of FIG. 3C, according to one embodiment of the present invention. As shown, the LSU array 375 includes the different LSUs 303 and an address generation unit 405. In a SIMT architecture, like the one described in FIGS. 3A-3C, a single instruction, such as a load or store access request, is broadcasted to a thread group (warp) of P parallel threads along with an active mask for the warp. The address generation unit 405 receives warp addresses for each access request, an active mask for the warp, and the bank mode. The shared memory 306 is coupled to the LSU array 375 via the memory and cache interconnect 380 and includes a read/write interface 430 and P banks 440.

The active mask indicates which individual threads in a warp are enabled to execute the instruction for the warp. Active threads execute the instruction and non-active threads do not execute the instruction. Threads may become active and non-active when divergence occurs during execution of a program due to branching or the like. Up to P active threads execute the instruction in simultaneously. An arithmetic instruction for P threads is executed by P parallel exec units 302. A memory load/store instruction for P threads is executed by P parallel LSUs 303. A memory instruction for P threads thus receives P addresses, which may be P or fewer different memory addresses.

The address generation unit 405 performs address calculation tasks, e.g., address mapping operations, for the access requests based on the bank mode. In one embodiment the address generation unit 405 may be configured to process an access request from a warp over multiple cycles, so that a sub-set of the threads are processed during each cycle of the multiple cycles. For example, a sub-set of 8 threads may be processed over 4 cycles when the warp includes 32 threads. The address generation unit 405 also determines if any bank conflicts exist between the per-thread mapped memory addresses for a warp. Importantly, memory addresses of threads that are not active, according to the active mask, do not cause a bank conflict.

The address generation unit 405 outputs the mapped memory addresses of the active threads that do not incur a bank conflict to the LSUs 303. The LSUs 303 then transmit a read or write request including one or more of the mapped memory addresses to the cache interconnect 308 to complete the access request for the active parallel threads in the warp. The maximum number of unique memory addresses that are transmitted in a single clock cycle is typically constrained by the memory architecture and the interface between the LSU array 375 and the memory and cache interconnect 308.

In one embodiment, the address generation unit 405 may be configured to output only the number of mapped memory addresses to the LSU 303 that can be transmitted by the LSU 303 as a single access request. When the number of mapped memory addresses for a warp is greater than the number, a replay request is output by the address generation unit 405 to the warp scheduler and instruction unit 312. The warp scheduler and instruction unit 312 will then resubmit the access request for execution at a later time and reserve additional clock cycles for execution of the load instruction to accommodate the transmission of multiple access requests as needed by the LSUs 303. Any subsequent instructions for the same warp are discarded, or otherwise prevented from being executed, until after the access request is replayed and successfully executed by the LSU array 375.

FIG. 4B is a conceptual diagram illustrating a mapping of an 8×8 array of 32 bit data to 8 32-bit banks. The 32-bit data mapped to 8 32-bit banks 460 is an example of a first mapping that uses a pad of one 32-bit word (shown as "fill") in each row so that either an entire row or column of the 8×8 array may be accessed without incurring any bank conflicts. Each element in the array is indicated with row:column. The first row or the array includes elements 0:0, 0:1, 0:2, 0:3, 0:4, 0:5, 0:6, and 0:7. The first column of the array includes elements 0:0, 1:0, 2:0, 3:0, 4:0, 5:0, 6:0, and 7:0.

FIG. 4C is a conceptual diagram illustrating a mapping of the 8×8 array of 32 bit data to 8 64-bit banks, according to one embodiment of the present invention. The 32-bit data mapped to 8 64-bit banks 462 is an example of a second mapping that also uses a pad of one 32-bit word in each row and maps the 32-bit data linearly in banks that are each 64 bits wide. This second mapping is the result of storing the 8×8 array of 32 bit data intended to be executed by legacy hardware in hardware that includes banks that are 64 bits wide instead of 32 bits wide using the 8BB bank mode.

There are no conflicts for accessing elements in the same row of the array. Specifically, for any given row N, all of N:[0 . . . 7] can be simultaneously access without incurring a bank conflict. In contrast, there are conflicts for accessing elements in the same column of the array, i.e., when [0 . . . 7]:M is accessed for a given column M. The elements that produce the bank conflicts are shown in bold characters. In particular, there are bank conflicts in bank 0 for column=1, in bank 1 for column=3, bank 2 for column=5, and bank 3 for column=7.

FIG. 4D is a conceptual diagram illustrating another mapping of the 8×8 array of 32 bit data to 8 64-bit banks, according to one embodiment of the present invention. The 32-bit data mapped to 8 64-bit banks 464 is an example of a third mapping that also uses a pad of one 32-bit word in each row and maps the 32-bit data in banks that are each 64 bits wide. Unlike the second mapping, this third mapping separates the 32-bit data into a low and high half of each bank. This third mapping is the result of storing the 8×8 array of 32 bit data intended to be executed by legacy hardware in hardware that includes banks that are 64 bits wide instead of 32 bits wide using the 4BB bank mode. Each row of data in the array is indicated with a different pattern. Each row and each column of the 8×8 array may be accessed without incurring a bank conflict.

Other arrangements of data, other than an N×M array may be stored in 32, 64, or 128 bit banks using the 8BB bank mode to avoid incurring bank conflicts when the data is access. Examples of other arrangements include stencil patterns.

Figure 5:
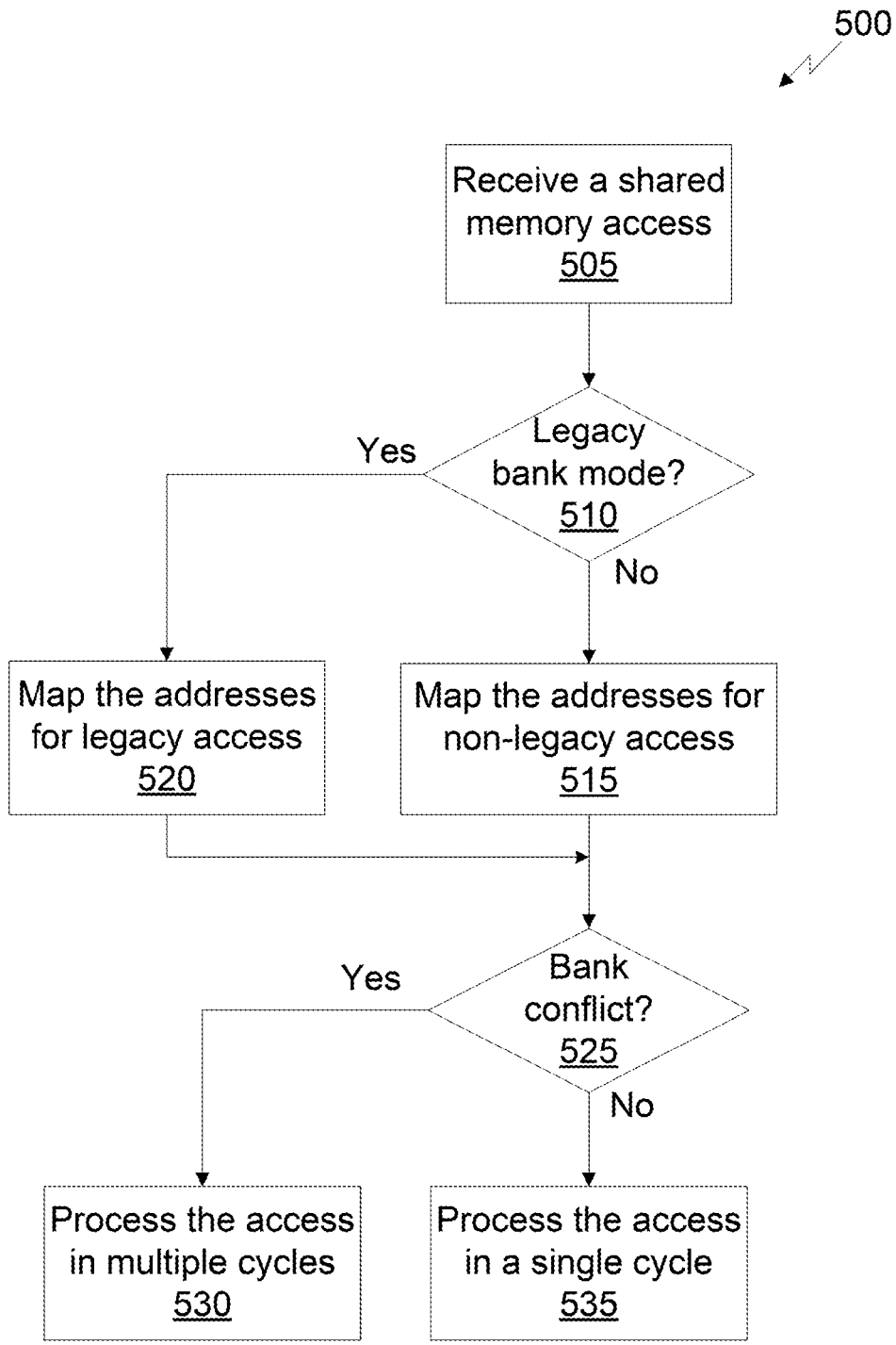
FIG. 5 sets forth a flow diagram of method steps for processing a access request for a multi-bank memory, according to one embodiment of the present invention.

FIG. 5 sets forth a flow diagram of method steps for processing a load instruction, according to one embodiment of the present invention. Although the method steps are described in conjunction with the systems of FIGS. 1, 2, 3A, 3B, and 3C, persons of ordinary skill in the art will understand that any system configured to perform the method steps, in any order, is within the scope of the inventions.

The method 500 begins at step 505, where address generation unit 405 receives memory access request including an individual memory address for each respective thread in the warp, a bank mode, and an active mask for the warp. At step 510 the address generation unit 405 determines if the bank mode is a legacy bank mode, such as the 4BB bank mode, and, if so, then at step 520 the address generation unit 405 dynamically maps the individual memory addresses based on the legacy bank mode to produce a mapped individual memory address for each respective thread in the first thread group.

In an embodiment in which the bank mode may be forced to a particular setting that is different than the bank mode specified for the grid or application program, the particular setting controls whether the address generation unit 405 proceeds to step 520 or step 515.

If, at step 510 the address generation unit 405 determines that the bank mode is not the legacy bank mode, then the address generation unit 405 determines that the bank mode is a non-legacy bank mode, such as the 8BB bank mode, and, at step 515 the address generation unit 405 dynamically maps the individual memory addresses based on the non-legacy bank mode to produce an mapped individual memory address for each respective thread in the first thread group.

At step 525 the address generation unit 405 determines if a bank conflict exists between two or more of the mapped individual memory addresses for the first thread group. If, the address generation unit 405 determines that a bank conflict does not exist, then at step 535 the address generation unit 405 transmits a read or write request to the multi-bank memory to process the access request in a single access cycle. Otherwise, at step 530 the address generation unit 405 transmits read or write requests to the multi-bank memory access to process the access request in multiple cycles. In one embodiment, when a bank conflict exists, the address generation unit 405 does not transmit any read or write requests to the multi-bank memory and instead issues a replay request to the warp scheduler and instruction unit 312 so that multiple cycles may be reserved for processing the access request.

One advantage of the disclosed method is that the address to bank mapping used to access a multi-bank memory may change each clock cycle. Each memory address specified for parallel thread in the thread group is dynamically mapped to a bank address based on a bank mode. Thus, a first application program that is authored to avoid bank conflicts when each bank stores 32 bits of data may use a different memory address to bank address mapping compared with a second application program that is authored to avoid bank conflicts when each bank stores 64 bits of data. In sum, a legacy application program authored for execution by a processor having a first bank size may run without incurring a performance degradation when executed on a contemporary processor capable of dynamically mapping addresses to support the first bank size as well as larger bank sizes needed for higher-bit width operations that are performed by the contemporary processor.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for accessing a multi-bank memory, the method comprising:
    receiving a first memory access instruction included in a plurality of memory access instructions, wherein a bank mode is concurrently specified for each memory access instruction in the plurality of memory access instructions, and the first memory access instruction specifies an individual memory address;
    receiving a bank mode that defines a per-bank bit-width for the first memory access instruction, wherein the bank mode specifies a first memory address-to-bank mapping when the bank mode is a first value and a second memory address-to-bank mapping when the bank mode is a second value;
    dynamically mapping the individual memory address based on the bank mode to produce a mapped individual memory address; and
    transmitting a read request or a write request to the multi-bank memory to execute the first memory access instruction.

2. The method of claim 1, wherein
    the first memory access instruction is for parallel execution by a first thread and additional threads in a first thread group,
    the individual memory address is specified for the first thread in the thread group,
    the first memory access instruction specifies additional individual memory addresses, including an individual memory address for each additional thread in the first thread group, and
    the per-bank bit-width is associated with the first thread group; and
    further comprising, dynamically mapping the individual memory address and the additional individual memory addresses based on the bank mode to produce a mapped individual memory address for the first thread and each additional thread in the first thread group.

3. The method of claim 2, wherein a first mapped individual memory address for the first thread in the first thread group and a second mapped individual memory address for a second thread in the first thread group both map to a first bank of the multi-bank memory.

4. The method of claim 3, wherein the first mapped individual memory address is included in the read request or the write request transmitted to the multi-bank memory during a first access cycle and the second mapped individual memory address is included in a second read or a second write request transmitted to the multi-bank memory during a second access cycle.

5. The method of claim 2, further comprising:
    receiving an active mask for the first thread group that indicates threads in the first thread group that should execute the first memory access instruction; and
    determining that a bank conflict does not exist within the first thread group when a first mapped individual memory address for the first thread that is active and a second mapped individual memory address for a second thread that is not active both map to a first bank of the multi-bank memory.

6. The method of claim 2, wherein the individual memory address and the additional memory addresses are each mapped to a different bank of the multi-bank memory for the per-bank bit-width and for a second per-bank bit-width and a number of bits access in each bank of the multi-bank memory is different for the bank mode compared with a different bank mode.

7. The method of claim 1, further comprising:
    receiving a second memory access instruction that specifies a second individual memory address;
    receiving a second bank mode that defines a second per-bank bit-width;
    dynamically mapping the second individual memory address based on the second bank mode to produce a second mapped individual memory address; and transmitting a second read or a second write request to the multi-bank memory to execute the second memory access instruction for the second mapped individual memory address.

8. The method of claim 1, wherein the per-bank bit-width is 32 and a second per-bank bit-width is 64.

9. The method of claim 1, wherein the per-bank bit-width is 64 and a second per-bank bit-width is 128.

10. The method of claim 1, wherein an N×M array of data is stored in the multi-bank memory and the first memory access instruction reads or writes either a column or a row of the N×M array without incurring a bank conflict.

11. The method of claim 1, wherein the bank mode is specified to access data stored in each bank of the multi-bank memory without incurring a bank conflict when each bank of the multi-bank memory is N times the per-bank bit-width.

12. The method of claim 1, wherein the bank mode further specifies a legacy bank mode corresponding to a different per-bank bit-width than the per-bank bit-width of the multi-bank memory.

13. The method of claim 1, wherein the bank mode further specifies a first fill pattern of pad words when the bank mode is the first value and a second fill pattern of pad words when the bank mode is the second value.

14. A processing subsystem comprising:
an address generation unit that is configured to:
  receive a first memory access instruction included in a plurality of memory access instructions, wherein a bank mode is concurrently specified for each memory access instruction in the plurality of memory access instructions, and the first memory access instruction specifies an individual memory address,
  receive a bank mode that defines a per-bank bit-width for the first memory access instruction, wherein the bank mode specifies a first memory address-to-bank mapping when the bank mode is a first value and a second memory address-to-bank mapping when the bank mode is a second value, and
  dynamically map the individual memory address based on the bank mode to produce a mapped individual memory address; and
a load/store unit coupled between the address generation unit and a multi-bank memory and configured to transmit a read request or a write request to the multi-bank memory to execute the first memory access instruction.

15. The processing subsystem of claim 14, wherein
the first memory access instruction is for parallel execution by a first thread and additional threads in a first thread group,
the individual memory address is specified for the first thread in the thread group,
the first memory access instruction specifies additional individual memory addresses, including an individual memory address for each additional thread in the first thread group, and
the per-bank bit-width is associated with the first thread group; and the address generation unit is further configured to dynamically map the individual memory address and the additional individual memory addresses based on the bank mode to produce a mapped individual memory address for the first thread and each additional thread in the first thread group.

16. The processing subsystem of claim 15, wherein a first mapped individual memory address for the first thread in the first thread group and a second mapped individual memory address for a second thread in the first thread group both map to a first bank of the multi-bank memory.

17. The processing subsystem of claim 16, wherein the first mapped individual memory address is included in the read request or the write request transmitted to the multi-bank memory during a first access cycle and the second mapped individual memory address is included in a second read request or a second write request transmitted to the multi-bank memory during a second access cycle.

18. The processing subsystem of claim 15, wherein the address generation unit is further configured to:
  receive an active mask for the first thread group that indicates threads in the first thread group that should execute the first memory access instruction; and
  determine that a bank conflict does not exist within the first thread group when a first mapped individual memory address for the first thread that is active and a second mapped individual memory address for a second thread that is not active both map to a first bank of the multi-bank memory.

19. The processing subsystem of claim 14, wherein the per-bank bit-width is 32 and a second per-bank bit-width is 64.

20. The processing subsystem of claim 14, wherein the per-bank bit-width is 64 and a second per-bank bit-width is 128.

21. The processing subsystem of claim 14, wherein an N×M array of data is stored in the multi-bank memory and the first memory access instruction reads or writes either a column or a row of the N×M array without incurring a bank conflict.

22. The processing subsystem of claim 14, wherein the bank mode is specified to access data stored in each bank of the multi-bank memory without incurring a bank conflict when each bank of the multi-bank memory is N times the per-bank bit-width.

23. A computing system, comprising:
a multi-bank memory; and
a processing subsystem, comprising:
  an address generation unit that is configured to:
    receive a first memory access instruction included in a plurality of memory access instructions, wherein a bank mode is concurrently specified for each memory access instruction in the plurality of memory access instructions, and the first memory access instruction specifies an individual memory address,
    receive a bank mode that defines a per-bank bit-width for the first memory access instruction, wherein the bank mode specifies a first memory address-to-bank mapping when the bank mode is a first value and a second memory address-to-bank mapping when the bank mode is a second value, and
    dynamically map the individual memory address based on the bank mode to produce a mapped individual memory address; and
  a load/store unit coupled between the address generation unit and the multi-bank memory and configured to transmit a read request or a write request to the multi-bank memory to execute the first memory access instruction for the mapped individual memory address.

24. A processing subsystem comprising:
an address generation unit that is configured to:
  receive a first memory access instruction that specifies a first individual memory address,
  receive a first bank mode that defines a first per-bank bit-width for the first memory access instruction, dynamically map the first individual memory address based on the first bank mode to produce a first mapped individual memory address, receive a second memory access instruction that specifies a second individual memory address, receive a second bank mode that defines a second per-bank bit-width, and dynamically map the second individual memory address based on the second bank mode to produce a second mapped individual memory address; and a load/store unit coupled between the address generation unit and a multi-bank memory and configured to:

transmit a first read request or a first write request to the multi-bank memory to execute the first memory access instruction for the first mapped individual memory address, and transmit a second read request or a second write request to the multi-bank memory to execute the second memory access instruction for the second mapped individual memory address.

* * * * *